Figure 1:
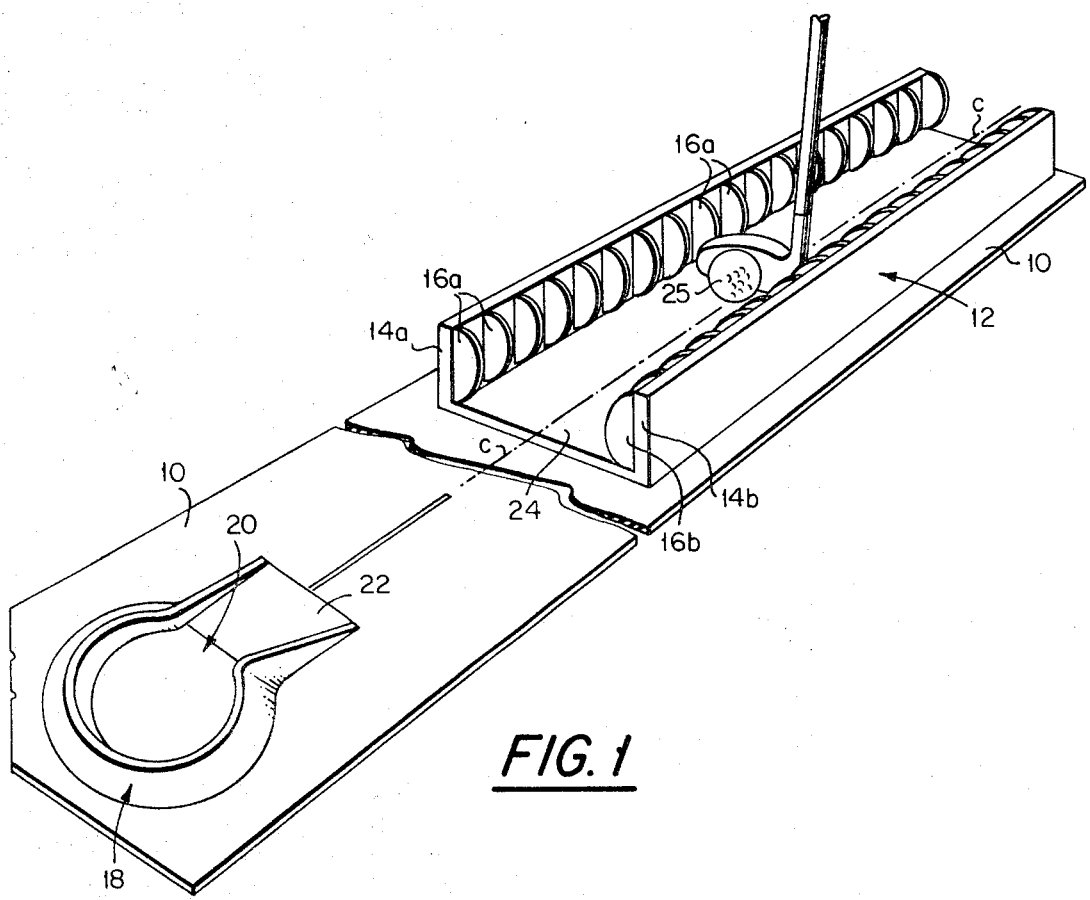
Figure 2:
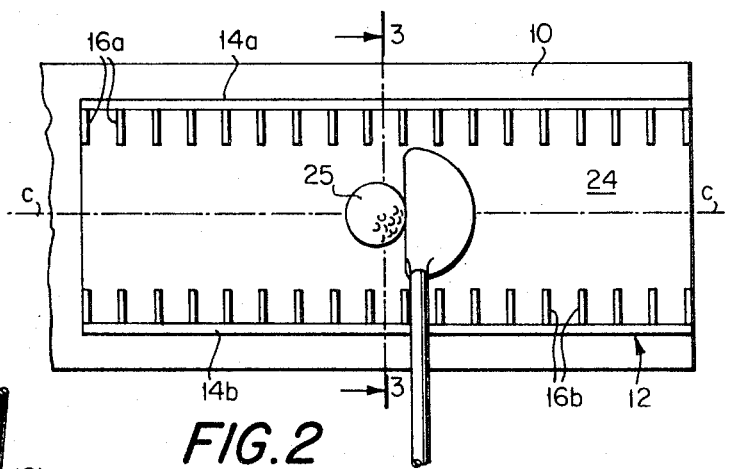
Figure 3:
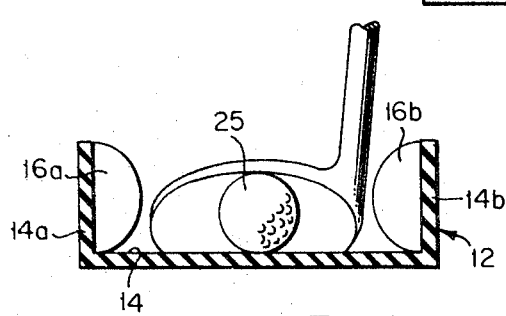

United States Patent

[11] 3,572,722

| [72] | Inventors | Stanley R. Harrison<br>Castle Bromwich, near Birmingham;<br>Robert M. Broughton, Boldmere,<br>Sutton Coldfield, England |
|---|---|---|
| [21] | Appl. No. | 651,122 |
| [22] | Filed | July 5, 1967 |
| [45] | Patented | Mar. 30, 1971 |
| [73] | Assignee | The Dunlop Company Limited<br>London County, England |
| [32] | Priority | July 22, 1966, Mar. 7, 1967 |
| [33] | | Great Britain |
| [31] | | 32984/66 and 10736/67 |

[54] PLAY BALLS
13 Claims, No Drawings

[52] U.S. Cl............................................ 273/218,
260/4, 260/5, 260/41.5, 260/876, 260/892,
260/893, 260/897
[51] Int. Cl. .................................................. A63b 37/00
[50] Field of Search.......................................... 260/872,
893, 5, 897; 260/876; 273/218, 229, 230; 260/4

[56] References Cited

UNITED STATES PATENTS

| 3,129,199 | 4/1964 | Lunk............................ | 260/892 |
| 3,238,156 | 3/1966 | Kohrn........................... | 260/2.5 |
| 3,313,868 | 4/1967 | Bartsch......................... | 273/218 |
| 3,313,868 | 4/1967 | Freda............................ | 260/897 |
| 3,421,766 | 1/1969 | Chimiel et al................. | 260/893 |
| 3,432,165 | 3/1969 | Haines et al. ................. | 260/893 |

FOREIGN PATENTS

| 738,875 | 10/1965 | Great Britain................ | 260/894 |
| 782,996 | 9/1957 | Great Britain................ | 260/892 |
| 696,901 | 10/1964 | Canada......................... | 260/894 |

Primary Examiner—John C. Bleutge
Attorney—Stevens, Davis, Miller & Mosher

ABSTRACT: A playball comprising a blend of rubber and a thermoplastic homopolymer of a styrene or substituted styrene, or a thermoplastic copolymer, terpolymer or interpolymer of a styrene or substituted styrene with (i) acrylonitrile or substituted acrylonitrile and/or (ii) an alkyl ester of acrylic or methacrylic acid and/or (iii) a diene, the rubber being present in the blend in an amount of from 10 percent to 90 percent by weight of the blend. The diene is preferably butadiene or isoprene.

PATENTED MAR 30 1971 3,572,722

INVENTOR
EDWARD T. BERG
BY Kurt A*anchor*

PLAY BALLS

This invention relates to playballs and particularly to playballs suitable for use as golf balls for general playing purposes and for practice on driving ranges.

Golf balls for use in tournaments and competitions are of a high quality with regard to durability, flight and playing characteristics, but such golf balls are expensive. For general playing purposes and for practice, such as on a driving range, it is usual to use a cheaper ball than the tournament balls, but the cheaper ball is required to have durability, flight characteristics and playing characteristics which do not differ greatly from those of a tournament ball. In particular, the practice ball is required to have good resistance to cutting and good flight characteristics such that when struck with a golf club the ball will travel approximately the same distance as a tournament ball would travel. Also, the practice ball should preferably have the same feel when struck as a tournament ball and should preferably result in the same "click" when struck as is given by a tournament ball.

According to the present invention there is provided a playball comprising a blend of (A) rubber and (B) a thermoplastic homopolymer of a styrene or substituted styrene, or a thermoplastic copolymer, terpolymer or interpolymer of a styrene or substituted styrene with (i) acrylonitrile or substituted acrylonitrile and/or (ii) an alkyl ester of acrylic or methacrylic acid and/or (iii) a diene, the rubber being present in the blend in an amount of from 10 percent to 90 percent by weight of the blend. The diene is preferably butadiene or isoprene.

The rubber used may be natural or synthetic and preferably the blend contains both a synthetic rubber, e.g. cis-polybutadiene and natural rubber.

Preferred copolymers of styrene are formed with butadiene, acrylonitrile or methyl methacrylate.

The substituted styrenes may be alkyl, halogenated or carboxylated styrenes. The substituted acrylonitrile may be alkyl-substituted.

Preferred interpolymers contain butadiene, styrene and methyl methacrylate or acrylonitrile. The latter are known commercially as ABS type polymers.

A tetrapolymer may be used by including minor amounts of other polymerizable monomers such as a monocarboxylic acid, e.g. acrylic acid, methacrylic acid or itaconic acid.

According to the present invention, there is also provided a method of forming a ball suitable for use as a golf ball comprising forming a blend having the composition set forth above, adding filler, if desired, to said blend and moulding the composition so obtained to form a ball.

The amount of rubber is preferably from 20 to 80 percent by weight and especially is from 30 to 70 percent by weight of the blend.

Examples of suitable synthetic rubbers are polybutadiene (especially cis-polybutadiene), copolymers of butadiene with styrene or acrylonitrile, polybutylene, copolymers of ethylene with propylene or higher alpha-olefines, polyisoprene and polychloroprene. It is to be understood that blends or mixtures of synthetic rubbers, or of natural rubber and one or more synthetic rubbers, may be used. Preferably, the rubber is cis-polybutadiene or a blend or mixture of cis-polybutadiene with natural rubber, and in this latter case the cis-polybutadiene should be present in an amount of at least 50 percent by weight of the blend or mixture. A high molecular weight cis-polybutadiene is preferred, e.g. a polymer having a molecular weight of from $2 \times 10^5$ to $2 \times 10^6$.

The blend of the thermoplastic homopolymer or copolymer and the rubber can be prepared by mixing the two components together on a mill or in an internal mixer at an elevated temperature. The temperature can conveniently be from 30° to 50° C. higher than the melting point of the thermoplastic component. Fillers, coloring agents and antioxidants, if required, can be added to the blend during this mixing. The blend may then be cooled to 115° C. to 125° C. prior to the addition of curing agents, if desired, after which the composition can be cooled and chipped or granulated.

The compositions are preferably cured and this is preferably effected by the use of organic peroxide curing agents such as dicumyl peroxide, or if desired curing can be effected by irradiation. Sulfur results in the cross-linking of only the rubber component and so it is preferred to use a peroxide curing agent which results in cross-linking of both or all of the components of the blend to yield a highly resilient ball which is not deformed under the conditions of impact by a golf club.

Usually, the curable composition of the blend will be cured by heating it in the presence of a curing agent at an elevated temperature and suitable temperatures are from 150° C. to 250° C. The composition is also moulded to form the ball at a temperature usually from 150° C. to 250° C. and so moulding and curing are usually effected substantially simultaneously. The composition can be formed into the ball by a variety of moulding techniques, e.g. injection, compression or transfer moulding. When the composition is cured by heating, the time required for curing will usually be short, say, 20 to 60 minutes, depending upon the half-life of the peroxide curing agent used.

In compositions based on resins in which an unsaturated carboxylic is used as comonomer the composition may contain a filler material which can be an active filler, i.e. one which acts as a thermolabile cross-linking agent as well as the filler. In the case where an active filler is used then there may be no need for an additional cross-linking agent to be employed, since a proportion of the filler acts in this way. Examples of active fillers are zinc oxide and magnesium oxide, while an example of a substantially inactive filler is titanium dioxide. The incorporation of a filler improves the properties of the composition, particularly in regard to the cutting resistance which is exceedingly important in connection with golf balls. The compositions containing the filler are still thermoplastic. The amount of filler material is usually from 30 to 70 percent by weight of the polymer and depends on the size and weight of the ball to be produced. Whilst most fillers can be used those with a very high specific gravity are preferred in order to reduce the required loading to a minimum.

A ball of the present invention can be a one-piece moulded ball or a composite ball consisting of two or more portions, for example the ball can comprise a core and cover, the core comprising a blend of (A) rubber and (B) a thermoplastic homopolymer of a styrene or substituted styrene, or a thermoplastic copolymer, terpolymer or interpolymer of a styrene or substituted styrene with (i) acrylonitrile or substituted acrylonitrile and/or (ii) an alkyl ester of acrylic or methacrylic acid and/or (iii) a diene, the rubber being present in the blend in an amount of from 10 percent to 90 percent by weight of the blend.

The cover can be of the same composition as the core or different. For example, the cover can be of one or more of the following: a blend of the type disclosed in our British Pat. application Nos. 32952/66 and 32953/66; balata; trans-polymers of a conjugated diolefine, for instance trans-polyisoprene, trans-polybutadiene, (preferably having a trans-polymer content of at least 90 percent); cis-polymers of conjugated diolefines, for instance cis-polyisoprene, cis-polybutadiene, (preferably having a cis-polymer content of at least 50 percent); natural rubber; polyurethanes; polyamides; copolymers of butadiene and styrene; polymers and copolymers of ethylene; polymers and copolymers of propylene; compositions of our British Pat. application Nos. 5693/65 and 38674/65; copolymers of unsaturated olefines with esters of unsaturated acids, for instance methyl methacrylate-butadiene copolymers, especially those of high (especially predominating) methyl methacrylate content, or neoprene, especially in crystalline form.

The cover can be one or more of the elastomeric materials disclosed in British Specification No. 1,037,091.

The cover composition can contain a filler, for example inorganic fillers such as silica lead carbonate or titanium dioxide, the latter being especially useful in providing a white appearance to the ball.

The term "copolymer" used in this Specification includes polymers obtained from two, three of more reactants (which can be monomers or partially polymerized materials), interpolymers, block polymers, and blends thereof.

The method by which the cover is fixed to the core depends upon the nature of the material used for the cover. Where it is a thermoplastic material it can be applied either by an injection moulding process, for instance one in which molten material is forced around the periphery of the core centrally mounted in a spherical mould, or it can be applied for instance in the form of two hemispherical shells encasing the core and which are moulded to the core and are sealed together along their edges to form a smooth integral spherical shell cover. The latter process can also be used where the material used for the cover is not thermoplastic.

The means by which the cover is fixed to the core depends very much upon the nature of material of the cover and core. Where the cover is formed by a process of injection moulding around the core there is normally no need for auxiliary means of fixing as the material of the cover will, while still molten, flow into intimate contact with the periphery of the core resulting in a strong bond between the two portions of the ball. However, where the cover is moulded, for example by compression moulding from two hemispherical shells, it may be necessary to use auxiliary means of fixing, for example an adhesive. An alternative auxiliary means of fixing is by mechanical interlocking means, for example by forming the core so as to have protuberances or recesses in its surface on to which the cover can lock when moulded on to the core.

A further form of golf ball according to the present invention is one in which the core itself consists of two or more portions. Such a structure is very useful where it is wished to concentrate the weight of the ball on the center, though it can be used in other circumstances. In such a structure the core can consist of a spherical inner portion or inner core (for instance a glass or steel ball) surrounded by two or more outer core portions which together form a spherical shell about it. For example, if there are two outer core portions they can be in the form of hollow hemispherical shells which together surround the inner core to form a composite structure of spherical shape. The material composing the inner core and outer core portions can be the same or different, and one or more of the inner core or outer core portions can comprise the blend of rubber and a homopolymer, copolymer, terpolymer or interpolymer of styrene as disclosed above.

The dimensions of the components of a composite golf ball according to the present invention may suitably be as follows:

| Ball diameter, inches | 1.62 | 1.68 |
|---|---|---|
| Two component ball: | | |
| Core diameter, inches | 0.75–1.6 | 0.75–1.64 |
| Preferred range, inches | 1.00–1.54 | 1.00–1.60 |
| Cover thickness, inch | 0.020–0.435 | 0.020–0.465 |
| Preferred range, inch | 0.040–0.310 | 0.040–0.340 |
| Particularly preferred range, inch | 0.060–0.125 | 0.060–0.125 |
| Three component ball: | | |
| Inner core diameter, inch | 0.25–1.00 | 0.25–1.00 |
| Overall core diameter, inches | 0.75–1.60 | 0.75–1.64 |
| Cover thickness | As for two component ball | |

The present invention provides a ball which can be produced more economically than conventional golf balls. Golf balls for use in tournaments and competitions usually consist essentially of a core comprising a core center of paste contained in a spherical rubber sac wound with rubber thread and/or rubber tape, and a cover compound of balata or the like moulded on to the core. Such balls have excellent durability flight and playing characteristics but they are expensive to produce due to the lengthy procedure of manufacture. A cheaper ball is required for general playing purposes and for practice (e.g. on practice driving ranges) and hitherto such practice balls, in commercial use, have usually had essentially the same construction as the tournament ball but having a solid rubber center and having a cover made of a cheaper material (e.g. polychloroprene) than the tournament ball. These practice balls are durable but they are nevertheless still relatively expensive to produce.

The present invention provides a ball moulded from a polymer composition without a thread-wound core, which has good flight characteristics.

The balls of the present invention, especially where they are one-piece moulded balls of uniform density throughout, can with advantage have a surface pattern according to our British Pat. application No. 13924/67.

The invention is illustrated by the following Examples in which Examples 1 to 5 described the manufacture and testing of one-piece golf balls and Examples 6 and 7 described the manufacture and testing of two-component balls.

EXAMPLE 1

30 parts of a polystyrene with viscosity of 2.1—2.25 centipoises and a softening point of 89—92° C., both according to BS.1493, were mixed with 52.5 parts of cis-polybutadiene (cis-content 97 percent; ML-4 at 100° C. of 50) and 17.5 parts of natural rubber in an internal mixer at 150—170° C. until a homogeneous blend resulted. 40 parts of lead carbonate, 3 parts of titanium dioxide and 1 part of a red pigment (for identification) were added and mixing continued until a homogeneous blend resulted. The mix was cooled to 120° C. and 3.5 parts of dicumyl peroxide were added.

The blend was then sheeted on a mill and the composition rapidly cooled to room temperature. The resulting sheet had a thickness of 0.120 inch.

Slabs 3 inches by 1 inch were cut from the sheet and were compression moulded and cured for 45 minutes in the mould at a temperature of 160° C. The cutting resistance of a cured slab was measured and compared with a conventional golf ball cover compound. Cutting resistance is given in arbitrary figures, a higher figure indicating a better resistance. The results are given in Table I. A ball A of diameter 1.62 inches was then moulded from the composition and cured, and its resistance to cutting in play and its flight characteristics were determined and are shown in Table I.

EXAMPLE 2

42.5 parts of an interpolymer, essentially of acrylonitrile-butadiene and styrene (commercially known as Cycolac H), were mixed with 43.1 parts of cis-polybutadiene (of the same type as used in Example 1) and 14.4 parts of natural rubber in an internal mixer at 150—170° C. until a homogeneous blend resulted. 39 parts of lead carbonate, 3 parts of titanium dioxide and 1 part of a red pigment (for identification) were added and mixing continued until a homogenous blend again resulted. The mix was then cooled to 120° C. and 3.25 parts of dicumyl peroxide were added. A ball B (1.62 inches diameter) and slabs were then moulded from the mix and cured as previously described in Example 1. The results of measurements made on the ball and slabs are shown in Table I.

EXAMPLE 3

27.5 parts of polystyrene (of the type used in Example 1) were mixed with 54 parts of cis-polybutadiene (of the type used in Example 1) and 18 parts of natural rubber in an internal mixer at 150—170° C. until a homogeneous blend resulted. 45 parts of lead carbonate, 3 parts of titanium dioxide and 1 part of a red pigment (for identification) were added and mixing continued until a homogeneous blend resulted. The mix was cooled to 120° C. and 3.5 parts of dicumyl peroxide were added.

A ball C (1.62 inches in diameter) and slabs were then moulded from the mix and cured as described in Example 1. The results of measurements made on the ball and slabs are shown in Table I.

EXAMPLE 4

A mix was made as described in Example 3 except that the 27.5 parts of polystyrene were replaced by 27.5 parts of a copolymer of styrene and acrylonitrile — available as Tyril 767, supplied by Dow Chemical Company Limited.

A ball D (1.62 inches in diameter) and slabs were moulded from the mix and cured as described in the previous Examples. The results of measurements made on the ball and slabs are shown in Table I below.

EXAMPLE 5

A mix was made as described in Example 3 except that the 27.5 parts of polystyrene were replaced by 27.5 parts of a copolymer of methyl methacrylate and styrene containing 85 percent of methyl methacrylate — available as Zerlon 150, supplied by Dow Chemical Company Limited.

A ball E (1.62 inches in diameter) and slabs were moulded from the mix and cured as described in the previous Examples. The results of measurements made on the ball and slabs are shown in Table I below.

EXAMPLE 6

A composition was made up as in Example 3 except that 42 parts of lead carbonate were added instead of 45 parts. The composition was sheeted on a mill and extruded in a cold extruder to produce a rod 1.125 inches diameter. Spherical cores, 1.04 inches diameter were moulded from plugs of the extrudate and cured for 7½ minutes at 150° C.

A cover composition was prepared as follows:

47.5 parts of a copolymer of ethylene and methacrylic acid, containing 7 percent of the acid in which 85 percent of the acid was present as the sodium salt, and having a melt flow index at 190° C. of 0.5 gram/10 minutes were mixed with 52.5 parts of cis-polybutadiene of the type described in Example 1, in an internal mixer at 150—170° C. until a homogeneous blend resulted. 42 parts of lead carbonate, 3.75 parts of titanium dioxide and 0.25 parts of a pigment (for identification were added and the mixing continued until a homogenous blend again resulted. The mix was cooled, chipped in a granulator and 3.5 parts of dicumyl peroxide were added by tumble mixing. The blend was then compression moulded into rough sheet at 100—120° C. and rapidly cooled to room temperature. The resulting sheet had a nominal thickness of 0.125 inches.

Slabs 3 inches by 1 inch were cut from the sheet and were compression moulded to 0.120 inches thickness and cured for 45 minutes in the mould at a temperature of 160° C.

Golf ball hemispherical half-shells having an internal diameter of 1.0 inch and wall thickness 0.310 inches were moulded from the above cover composition by heating at 100—110° C. in a mould and cooling prior to extraction. The cores already prepared were coated with a 20 percent solution of triphenyl methane triisocyanate in methylene chloride and the solvent allowed to evaporate. Two half-shells were placed around a treated core and moulded in a dimpled mould at 160° C. for 45 minutes, followed by cooling prior to extraction, to produce a golf ball F (1.62 inches in diameter) and of weight 45.0 grams. The results of measurements made on the ball and slabs are shown in Table I below.

EXAMPLE 7

40 parts of an interpolymer essentially of acrylonitrile-butadiene and styrene (commercially known as Cycolac H) as used in Example 2, were mixed with 60 parts of cis-polybutadiene (as used in Example 1) in an internal mixer at 150—170° C. until a homogeneous blend resulted. 40 parts of lead carbonate were added and mixing continued until a homogeneous blend resulted. The mix was cooled to 120° C and 3.5 parts of dicumyl peroxide were added.

The blend was then sheeted on a mill and the composition extruded as a rod 1.125 inches diameter in a cold extruder. Spherical cores 1.04 inches diameter were moulded from plugs of the extrudate for 7½ minutes at 150° C.

Slabs 3 inches by 1 inch, 0.120 inches thick, and golf ball cover half-shells were prepared using the cover composition and method described in Example 6. A golf ball G was then made by moulding two half-shells around a core of this Example, using the method described in Example 6. Ball G was 1.62 inches in diameter and weighed 44.7 grams. The results of measurements made on the ball and slabs are shown in Table I below.

For purposes of comparison a conventional thread wound range ball H of diameter 1.62 inches was subjected to the same series of tests as the balls and slabs made by following the procedure of Examples 1 to 7 (A to G, respectively).

In Table I the headings to the various columns have the following meaning:

CR (b) = Cutting resistance of the ball.
CR (s) = Cutting resistance of a slab of the composition
H = Hardness (Shore C)
Rebound = Percent rebound from a height of 100 inches on to a solid concrete base
Resilience = Coefficient of restitution determined by firing a projectile at the ball and noting the time taken for ball and projectile to travel a predetermined distance.
CH = Compression Hardness.

"Click" is the sound made by contact between the golf club and the ball.

"Carry" represents the distance travelled by the ball from where it is struck to where it first lands on the ground.

"Total Distance" represents the total distance travelled by the ball from where it is struck to where it finally comes to rest on the ground, and "Trajectory" is an arbitrary scale for comparing the heights to which balls rise during flight, a higher figure indicating a higher flight path.

The data are as follows:

TABLE I

| | CR(b) | CR(s) | H | Rebound | Resilience | CH | Click | Carry (yds) | Total distance (yds) | Trajectory |
|---|---|---|---|---|---|---|---|---|---|---|
| A | Good | 330 | 75 | 67 | 0.528 | 76 | Fairly good | 187 | 245 | 21¾ |
| B | do | 340 | 65 | 62 | 0.499 | 87 | do | 187 | 253 | 18¼ |
| C | Fairly good | 330 | 70 | 73 | 0.628 | 91 | do | 216 | 252 | 22 |
| D | do | 300 | 65 | 70 | 0.560 | 100 | do | 207 | 236 | 22 |
| E | Good | 305 | 66 | 75 | 0.578 | 109 | do | 209 | 238 | 22 |
| F | Very good | 340 | 73 | 69 | 0.588 | 94 | Good | 190 | 243 | 23 |
| G | do | 340 | 71 | 72 | 0.603 | 67 | do | 209 | 261 | 23 |
| H | Good | 320 | 70 | 60 | 0.550 | 100 | do | 188 | 256 | 21½ |

It will be seen from the above that the balls produced by the invention have similar properties in some respects to conventional range balls and in some respects are superior.

We claim:

1. A solid molded golf ball of a composition providing the gravity, click, rebound and size required for a golf ball comprising a polymer blend consisting essentially of rubber selected from the group consisting of natural rubber, polybutadiene, copolymers of butadiene with styrene or acrylonitrile, polybutylene, copolymers of ethylene with propylene or higher alpha-olefins, polyisoprene and polychloroprene and a thermoplastic polymer selected from the group consisting of:
   i. a homopolymer of styrene;
   ii. a homopolymer of substituted styrene;
   iii. a copolymer of a styrene and an acrylonitrile;
   iv. a copolymer of a styrene with an alkyl ester of acrylic or methacrylic acid;
   v. a copolymer of a styrene with a diene, and
   vi. a terpolymer or interpolymer of a styrene with at least two co-monomers selected from the following:

a. an acrylonitrile;
b. an alkyl ester of acrylic or methacrylic acid, and
c. a diene; said rubber being present in said blend in an amount of from 10 percent to 90 percent by weight of said blend.

2. A golf ball according to claim 1, which consists of a core consisting essentially of the blend of claim 1, encased in a cover.

3. A golf ball according to claim 2, in which the core consists of at least two portions at least one of which consists essentially of the blend defined in claim 1.

4. A golf ball according to claim 1, in which the rubber is present in an amount of from 60 percent to 80 percent by weight of the blend.

5. A golf ball according to claim 1, in which the rubber is a cis-polybutadiene.

6. A golf ball according to claim 5, in which the rubber is a blend of cis-polybutadiene with natural rubber and/or at least one synthetic rubbers.

7. A golf ball according to claim 1, in which the rubber is a copolymer of butadiene with styrene or acrylonitrile.

8. A golf ball according to claim 1, in which the rubber is polybutylene, polychloroprene or polyisoprene.

9. A golf ball according to claim 1, in which the rubber is an elastomeric copolymer of ethylene with propylene or with a higher alpha-olefine.

10. A golf ball according to claim 1, in which the diene is butadiene or isoprene.

11. A golf ball according to claim 1, in which the alkyl ester of methacrylic acid is methyl methacrylate.

12. A golf ball according to claim 1, in which the interpolymer contains styrene, butadiene and methyl methacrylate.

13. A golf ball according to claim 1, in which the interpolymer contains styrene, butadiene and acrylonitrile.